United States Patent [19]

Suzuki et al.

[11] Patent Number: 4,487,283
[45] Date of Patent: Dec. 11, 1984

[54] MOTORCYCLE

[75] Inventors: Masaaki Suzuki, Kamifukuoka; Kenzi Izawa, Asaka; Katsumi Kimura, Kawagoe, all of Japan

[73] Assignee: Honda Motor Co., Ltd., Tokyo, Japan

[21] Appl. No.: 428,468

[22] Filed: Sep. 29, 1982

[30] Foreign Application Priority Data

Oct. 19, 1981 [JP] Japan .............................. 56-166669
Oct. 19, 1981 [JP] Japan .............................. 56-166671
Oct. 19, 1981 [JP] Japan .............................. 56-166672

[51] Int. Cl.³ .............................................. B62J 17/00
[52] U.S. Cl. ................................ 180/219; 280/281 B; 280/289 S; 296/78.1
[58] Field of Search ............ 280/281 B, 289 S, 281 R; 180/219, 225; 296/78.1

[56] References Cited

U.S. PATENT DOCUMENTS 2,225,914 12/1940 Lewis et al. ........................ 180/219
2,721,745 10/1955 Torre .................................. 180/219
3,927,727 12/1975 Hanagan ............................ 180/219

FOREIGN PATENT DOCUMENTS 516776 2/1955 Italy .................................... 180/225

Primary Examiner—Joseph F. Peters, Jr.
Assistant Examiner—D. Lynn Fugate
Attorney, Agent, or Firm—Arthur L. Lessler

[57] ABSTRACT

In a motorcycle, the frame body has the shape of a single pipe over its whole length, and carries a front shield at its front portion, a floor at its intermediate portion, and a body cover at its rear portion, respectively. The front shield is formed of a one-piece member formed integrally with a head lamp housing, an auxiliary fender, leg shields, and foot rests. The body cover is formed of a one-piece member formed integrally with a plurality of continuous vertical walls which cooperatively enclose a space below the seat. The floor is joined at its opposite lateral edges to a pair of brackets mounted on the intermediate portion of the frame body at opposite lateral sides of the latter.

11 Claims, 12 Drawing Figures

MOTORCYCLE

BACKGROUND OF THE INVENTION

This invention relates to a motorcycle, and more particularly to a body framing for motorcycles, which has a simplified construction and also facilitates mounting a front shield, a floor, and a body cover thereon.

In a conventional motorcycle having a floor, which is generally called "a motor scooter", and which includes a motor tricycle having one front wheel and two rear wheels, the frame body forming the body framing carries a front shield at its front portion, a floor at its intermediate portion, and a body cover at its rear portion, respectively. As known e.g. from Japanese Provisional Patent Publication No. 54-101758, the body framing generally comprises a front half portion formed of a pipe and substantially vertically and downwardly extending, and a rear half portion formed of a pair of parallel pipes and rearwardly and upwardly extending from the lower end of the front half portion in a bifurcated manner. The paired parallel pipes forming the rear half portion are joined to the lower end of the front half portion by means of welding or like means, and transversely spaced from each other by a suitable number of cross members bridged therebetween. Therefore, the conventional frame body has rather a large number of component parts, requiring a large number of man-hours for fabrication and assemblage, because the individual parts have to be separately fabricated and assembled. Further, the space defined between a rear portion of the paired parallel pipes and inner walls of the body cover mounted on the pipes is rather small in volume, making it difficult to mount the body cover onto the parallel pipes. Therefore, the conventional frame body is not satisfactory in respect of mass productivity, and mountability of parts.

On the other hand, the front shield and the body cover are conventionally each comprised of a plurality of discrete parts. For instance, the former is formed of an upper part and a lower part, and the latter a front part and a rear part, or a front part, opposite lateral side parts and a rear part, respectively. Therefore, the front shield and the body cover suffer from a large number of component parts as well as a large number of man-hour for fabrication and assembalge of the component parts. Also, they are complicate in construction.

Further, in a conventional motorcycle, a front fender, which is joined to a front fork rotatably supporting the front wheel, downwardly extends at a location rearward of the front wheel. The front shield is fabricated separately from the front fender so as to avoid the front shield interfering with turning of the front fender, which necessitates arranging the front edge of the floor at rather a rearward location. However, a space must be provided on the floor, on which the driver's foots are to be rested, resulting in a large axial size of the body of the motorcycle.

Further, the floor of a conventional motorcyle is formed with several fitting holes opening in its upper surface, through which screws or bolts extend to fasten the floor to supporting stays. The floor is also formed with grooves or recesses around the above fitting holes so that the heads of the screws or bolts do not project above the upper surface of the floor.

In such floor arrangement, mud or dust can often stay in the above grooves or recesses, which is difficult to remove, even by washing the motorcycle body, taking much time to completely remove the mud or dust. Further, the upper surface of the floor having such grooves or recesses is not smooth, and therefore has a poor appearance.

OBJECTS AND SUMMARY OF THE INVENTION

It is an object of the invention to provide a motorcycle having a floor, which has a body framing excellent in mass productivity, mountability of component parts, and structural strength.

It is a further object of the invention to provide a motorcycle having a floor, which has a front shield and a body cover mounted on the body framing, which are easy to fabricate and assemble and simple in construction.

It is a still further object of the invention to provide a motorcycle having a floor, which can have a large space on the floor, on which the driver's foots are to be rested, and therefore can be short in axial body size.

It is another object of the invention to provide a motorcycle having a floor, in which the floor can have little mud or dust adhering thereto, facilitating washing of the motorcycle body, and excellent in appearance.

According to the motorcycle of the present invention, the frame body comprises a tubular member which has the shape of a single pipe over its whole length, and has a first portion vertically extending and slightly forwardly inclined, a second portion substantially horizontally and rearwardly from a lower end of the first portion, a third portion upwardly extending from a rear end of the second portion and slightly rearwardly inclined, and a fourth portion substantially horizontally and rearwardly extending from an upper end of the third portion. The frame body carries a front shield at the first portion, a floor at the second portion, and a body cover at the fourth portion.

The front shield comprises a head lamp housing, an auxiliary fender located immediately below the head lamp housing and intervening between the first portion of the frame body and the front wheel, a pair of leg shields located at opposite lateral sides of the auxiliary fender and downwardly extending from a location in the vicinity of the head lamp housing, the leg shields being located at opposite lateral sides of the head pipe, the front fork and a rear edge of the front wheel, and a pair of foot rests substantially horizontally and rearwardly extending from lower ends of the leg shields into a level flush with the floor surface. The frontshield is formed of a one-piece member formed integrally with the head lamp housing, the auxiliary fender, the leg shields, and the foot rests.

The floor is joined at its opposite lateral edges to a pair of brackets which are secured on the second portion of the frame body at its opposite lateral sides and axially extend parallel with each other.

The body cover comprises a front wall located below a front end of the seat, opposite front lateral side walls located below opposite lateral side walls of the seat, and opposite rear and upper lateral side and upper walls arranged opposite a rear end of the seat, the walls cooperatively enclosing a space defined below the seat. The body cover is formed of a one-piece member formed integrally with the above front wall, the opposite front lateral side walls and the opposite rear lateral side walls.

The above and other objects, features and advantages of the invention will be more apparent from the ensuing

DETAILED DESCRIPTION

Figure 1:
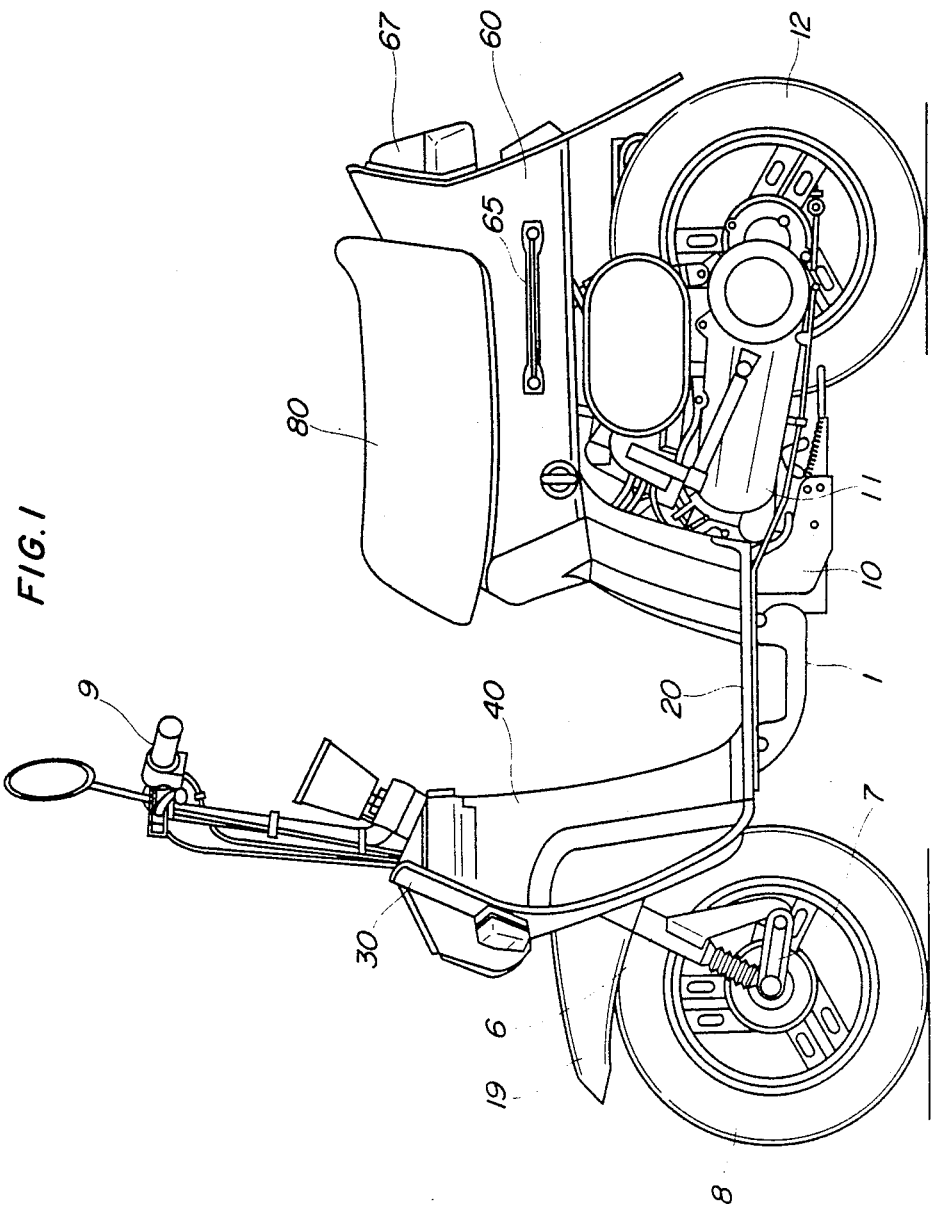
FIG. 1 is a side view of a motorcycle according to one embodiment of the present invention.
Figure 2:
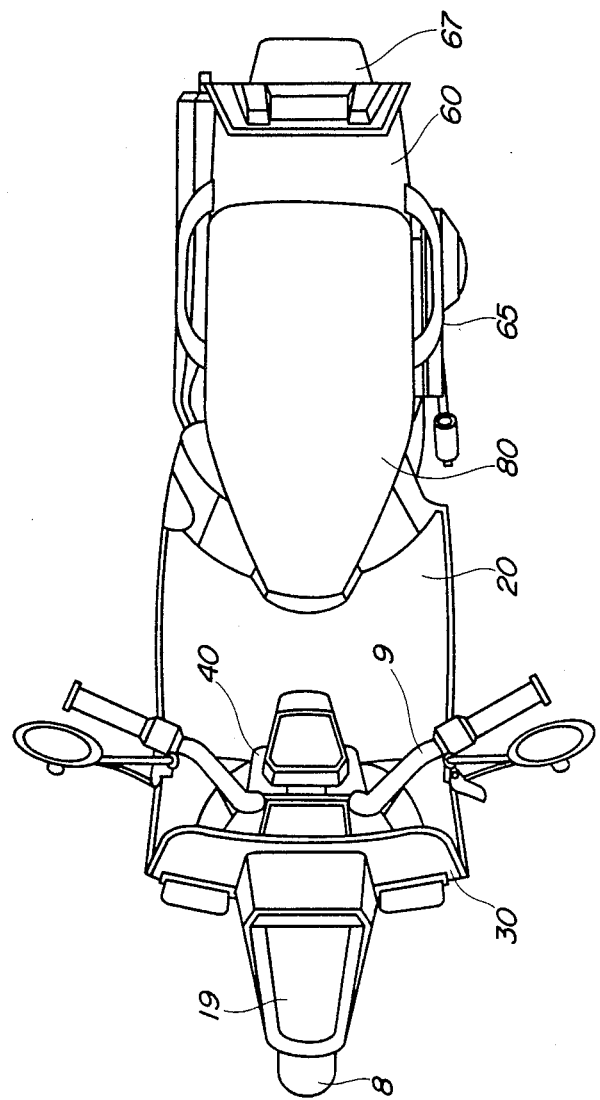
FIG. 2 is a top plan view of the motorcycle of FIG. 1.

The present invention will now be described in detail with reference to the drawing showing an embodiment thereof.

The drawings illustrate a motorcycle according to the invention. Reference numeral 1 designates a frame body forming the body framing of the motor scooter-type motorcycle, which comprises a head tube 2 rotatably supporting a front fork 6, a main tube 3 integrally joined at its front or upper end to the head tube 2 by means of welding or like means, a center tube 4 integrally joined at its front and lower end to a rear end of the main tube 3 by means of a gusset 5 secured to the tubes 3 and 4 by welding or like means. The head tube 2 turnably supports a front fork 6, on a lower end of which is rotatably mounted a front wheel 8 through a buffer 7. A steering handle 9 is rigidly secured on an upper end of the front fork 6. The main tube 3 has a generally L-shaped configuration having a front portion 3a downwardly extending from the head tube 2 and slightly forwardly inclined, and a rear portion 3b substantially horizontally and rearwardly extending from a lower end of the main tube 3. The center tube 4 has a front portion 4a upwardly extending from a rear end of the main tube 3 and rearwardly inclined, and a rear portion 4b substantially horizontally and rearwardly extending from an upper end of the front portion 4a. A U-shaped recess is defined between the main tube 3 and the front portion 4a of the center tube 4, for receiving a floor 20 therein. Although in the illustrated embodiment the main tube 3 and the center tube 4 are formed of separate tubes joined together, they may be fabricated from a single tubular member.

A bottom plate 10 is rigidly secured on a front and lower end of the center tube 4 and rearwardly extending, at which an engine 11 is mounted on the frame body 1. A rear wheel 12 engages with the engine 11 to be rotatatively driven thereby.

The horizontal rear portion 3b of the main tube 3 and the gusset 5 are formed, respectively, with transverse through holes 3c and 3d and carry two front and rear stays 13, 13 transversely extending through the through holes 3c and 3d in parallel and spaced relation to each other. Two brackets 14 and 14 are secured on ends of the stays 13 and 13 projected laterally from the main tube 3, and extend axially of the frame body 1.

A front stay 15 for mounting a fuel tank 70 and a rear stay 16 for a battery, not shown, are transversely rigidly secured on the rear portion 4b of the center tube 4. Another stay 18 for mounting a rear cover 66 is rigidly secured on a rear end of the center tube 4.

The floor 20 is molded in one body from a synthetic resin material, and comprises a horizontal floor portion 21, a main tube cover mounting portion 22 having a semicylindrical shape, erected from a front and central edge of the floor portion 21, a covering wall 23 erected from a rear edge of the floor portion 21, thickened opposite lateral edges 24, and two fitting flanges 25 downwardly pending from the lateral edges 24.

Reference numeral 30 designates a front shield, which is mounted on a front edge of the floor 20, and comprises a head lamp housing 31 located in front of the head tube 2, an auxiliary fender 32 located immediately below the head lamp housing 31 and interposed between the front portion 3a of the main tube 3 of the frame body 1 and the front wheel 8, a pair of left and right leg shields 33 located at opposite lateral sides of the auxiliary fender 32 and downwardly extending from a location in the vicinity of the head lamp housing 31, and a pair of left and right foot rests 34 substantially horizontally and rearwardly extending from lower ends of respective leg shields 33 into a level flush with the upper surface of the floor 20. The front shield 30 is formed of a one-piece member formed integrally with the above four portions 31, 32, 33 and 34. The auxiliary fender 32 has a concave front surface 32a, and substantially vertically extends from a location immediately below the head lamp housing 31 to a location in the vicinity of the lower end of the front portion 3a of the main tube 3. The leg shields 33 have its upper portions located slightly forwardly of the head tube 2 and an upper portion of the front fork 6 in a manner enclosing them laterally thereof, and its lower portions located slightly forwardly of a rear edge of the front wheel 8 in a manner enclosing same laterally thereof. The floor rests 34 each have a fitting rear edge 35 formed with a through hole 36 which is aligned with a corresponding fitting hole 14b formed in the corresponding bracket 14. The front shield 30 is joined to a front edge of the floor 20 by means of screws 37 extending through the holes 36 and nuts 38 screwed on the screws 37.

A shield rib 39 is forwardly projected from an upper edge of the auxiliary fender 32 (FIG. 8) to turn back mud or water splashed upwardly by the front wheel 8, thus preventing the mud or water from adhering to an upper bearing portion of the front fork 6.

A main tube cover 40 is arranged to cover a front portion of the main tube 3 of the frame body 1. The cover 40 has two engaging pawls 41 projected from its lower edge and engaging with engaging holes 22a formed in the mounting portion 22 of the floor 20. It also has two holes 43 formed in its front left and right joining edges 42 disposed in tight contact with an upper rear face of the front shield 30. Thus, the cover 40 is dismountably joined to the front shield 30 by means of screws 44 extending through the holes 43 and fitting holes, not shown, formed in the front shield 30, and nuts 45 tightened on the screws 44.

Figure 8:
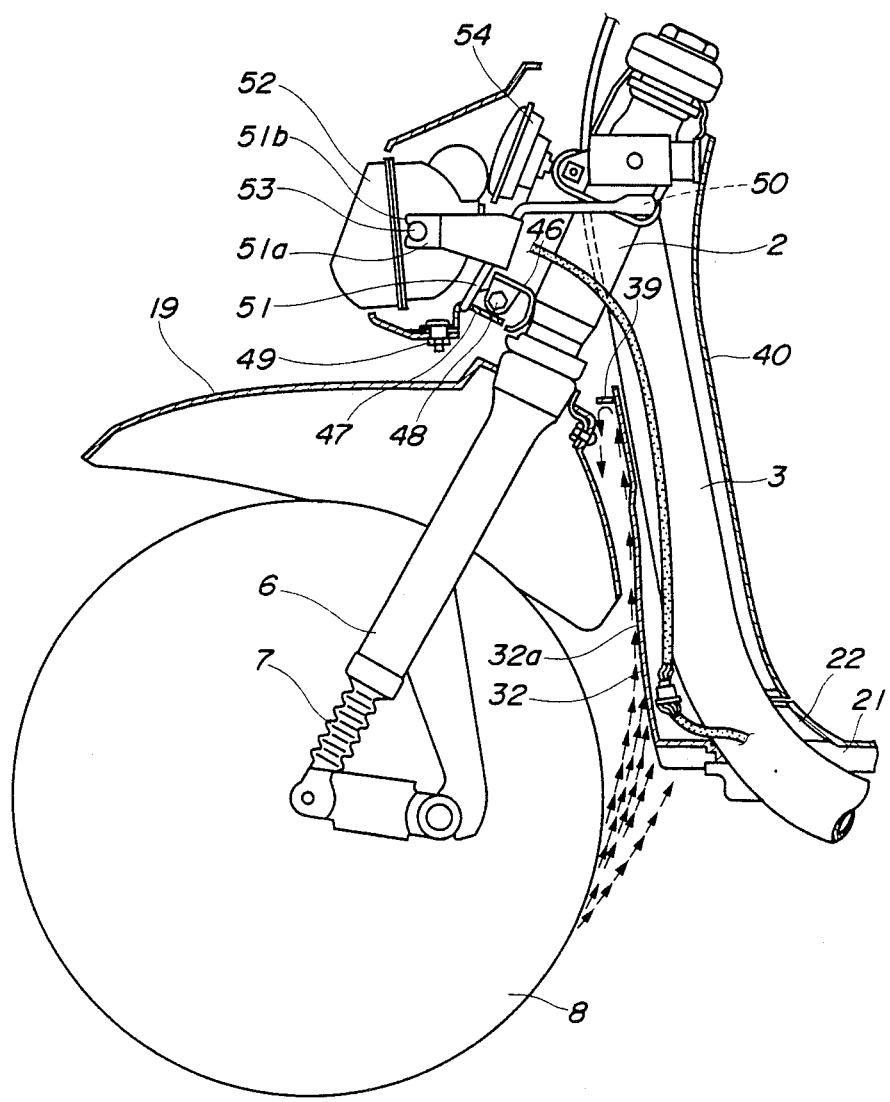
FIG. 8 is a longitudinal sectional side view of a front portion of the motorcycle of FIG. 1.
Figure 9:
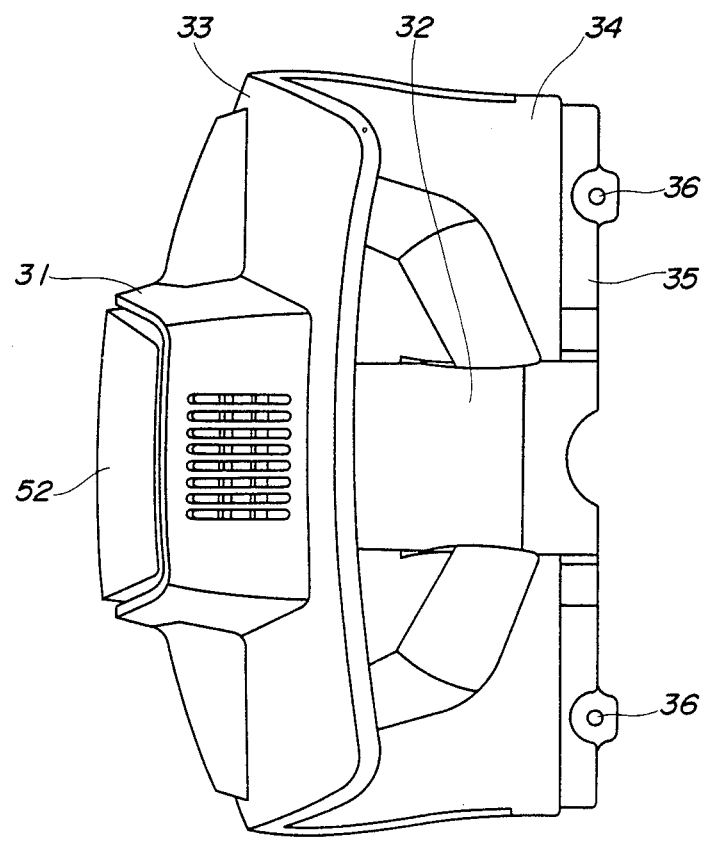
FIG. 9 is a top plan view of the same portion of FIG. 8.

A stay 46 is forwardly projected from a lower portion of the head tube 2, on which is dismountably mounted a front shield fitting bracket 47 by means of a bolt and a nut 48. Dismountably mounted on the bracket 47 is lower part of the head lamp housing 31 by means of a fastener 49 formed by a screw and a nut (FIG. 8).

A head lamp fitting bracket 51 is dismountably mounted, at its root end, on the head tube 2 by means of a bolt 50, and also engages, at its other end, with the front shield fitting bracket 47. The head lamp fitting bracket 51 has left and right forwardly extending bifurcated brackets 51a and carries the head lamp 52 mounted thereon, by means of bolts 53 each fitted through a notch 51b formed in the bifurcated bracket 51a and screwed in the head lamp 52.

Figure 3:
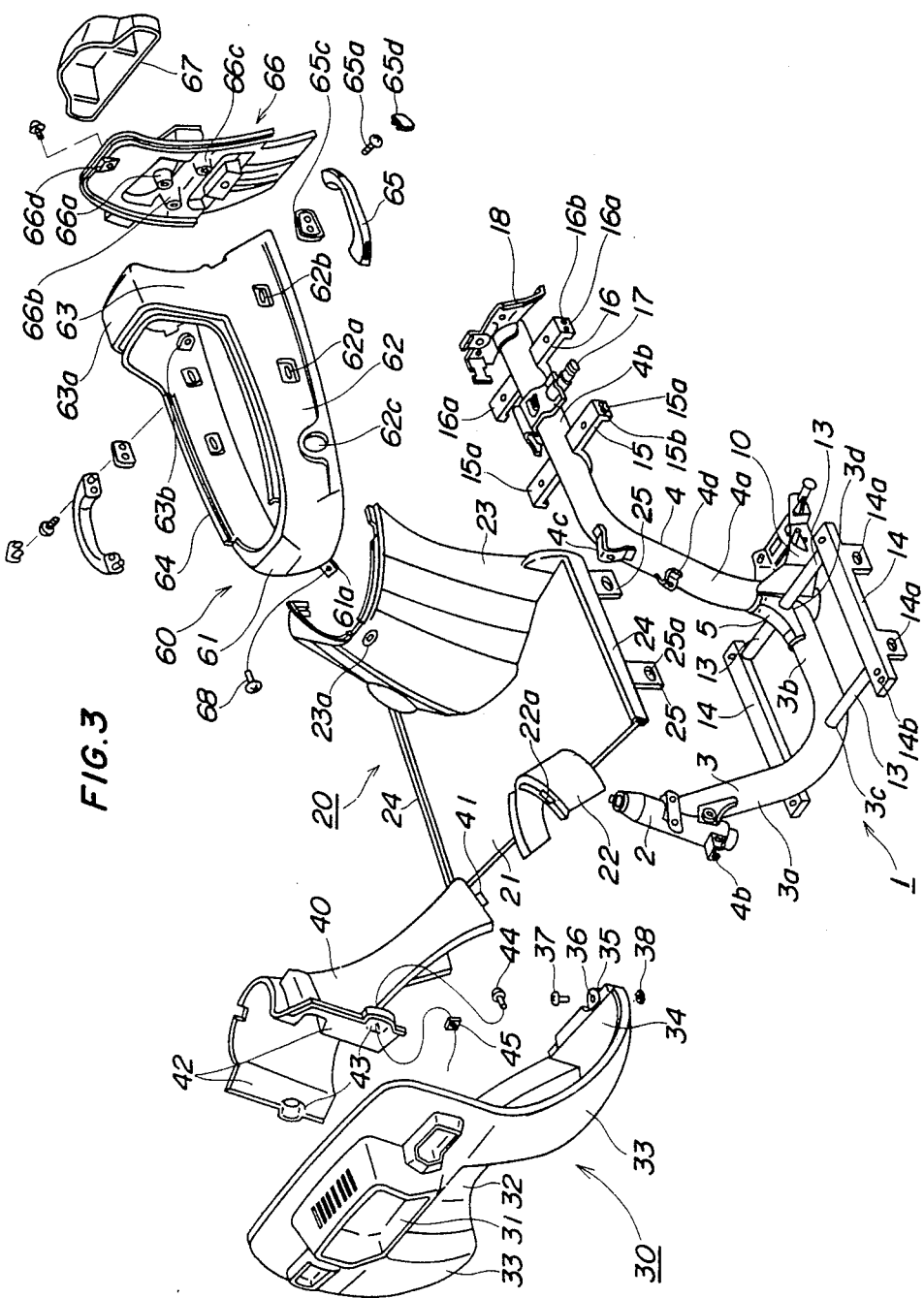
FIG. 3 is an exploded perspective view of the motorcycle of FIG. 1, showing a frame body, a front shields, a floor, and a body cover.
Figure 4:
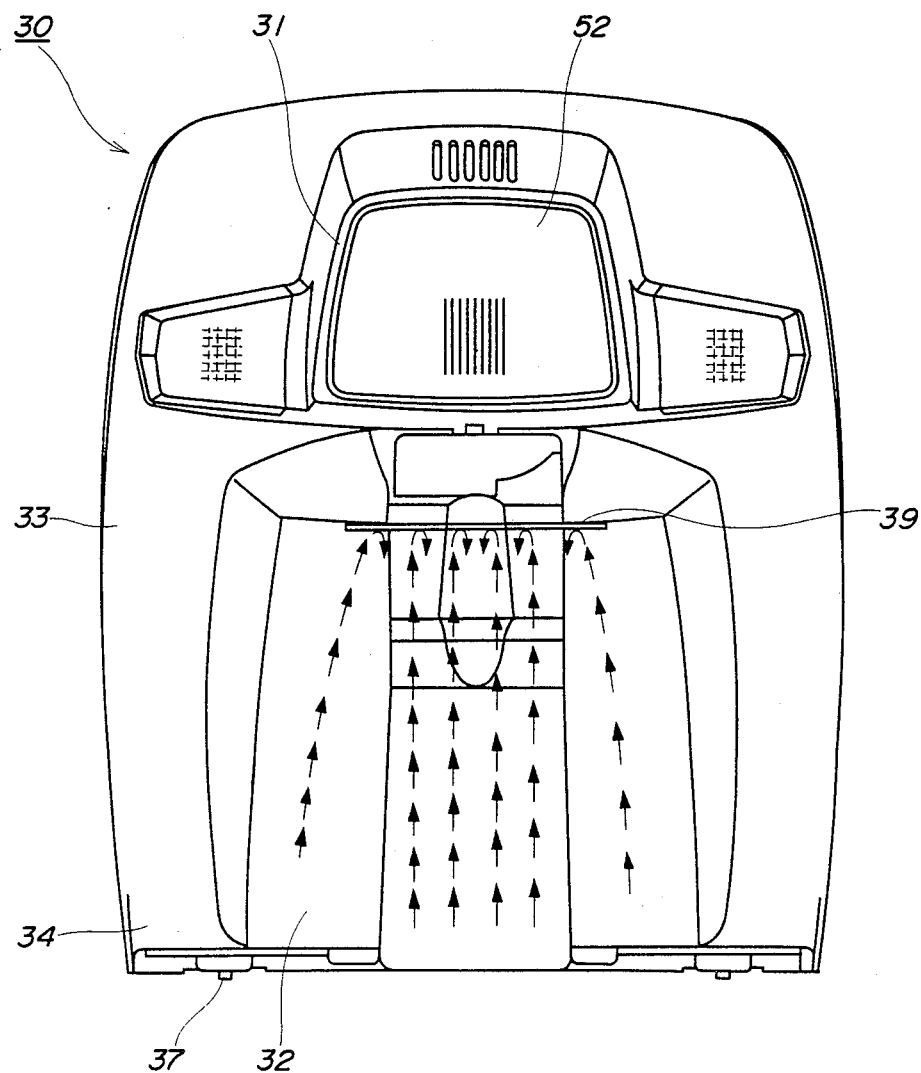
FIG. 4 is a front view of the front shields.

In FIG. 3, reference numeral 60 designates a body cover, which is disposed under and behind a seat 80, and is coupled to the covering wall 23 of the floor 20. This body cover has a configuration elongate in the axial direction of the motorcycle body, and comprises a front wall 61 transversely extending, opposite front lateral side walls 62, 62 axially and rearwardly extending from the front wall 61, and opposite rear lateral side walls 63, 63 rearwardly and upwardly extending from the front lateral side walls 62, 62. The body cover 60 has its ceiling and bottom surfaces and rear end surface all opened. The left and right walls 63 and 63 are combined together through a ceiling wall 63a. The body cover 60 is formed of a one-piece member formed integrally with the above walls 61, 62, 63 and 63a. The front wall 61 is located below a front wall of the seat 80, and the front lateral side walls 62, 62 below lateral side walls of the seat, respectively. And, the rear lateral side walls, 63, 63 are arranged opposite a rear end of the seat 80, at a location above the rear wheel 12. These walls 61, 62 and 63 cooperate to enclose a space defined below the seat 80.

The front wall 61 of the body cover 60 has a coupling bracket 61a projected from its lower edge and engaging with a hole 23a formed in the covering wall 23 of the floor 20, and the front lateral side walls 62 and 62 are formed with body cover fitting openings 62a and 62b, as well as an opening 62c for fitting a fuel cock remote controlling dial, not shown. A pair of left and right body cover fitting brackets 63b and 63b are formed on inner walls of the rear lateral side walls 63 and 63, and a further pair of left and right body cover fitting brackets, not shown, on rear end edges of the rear lateral side walls 63 and 63, respectively. The body cover 60 is rigidly secured on the stays 15 and 16 in such a manner that the fitting openings 62a and 62a are fitted on opposite ends 15a and 16a of the stays 15 and 16 of the center tube 4 and secured thereto by means of glove rails 65 and 65 and screws 65a and 65a fastening the body cover 60, the stays 15, 16 and the glove rails 65 together.

The body cover 60 has its opened rear end face receiving a member 66 for mounting a combination lamp 67 serving as a tail lamp and a winker. This member 66 is threadedly secured on the rear cover fitting stay 18, at its fitting bosses 66a, 66b and 66c, and also threadedly secured, at its threadedly fitting portion 66d, on a bracket, not shown, upwardly projected from a rear end edge of the ceiling wall 63a.

Figure 10:
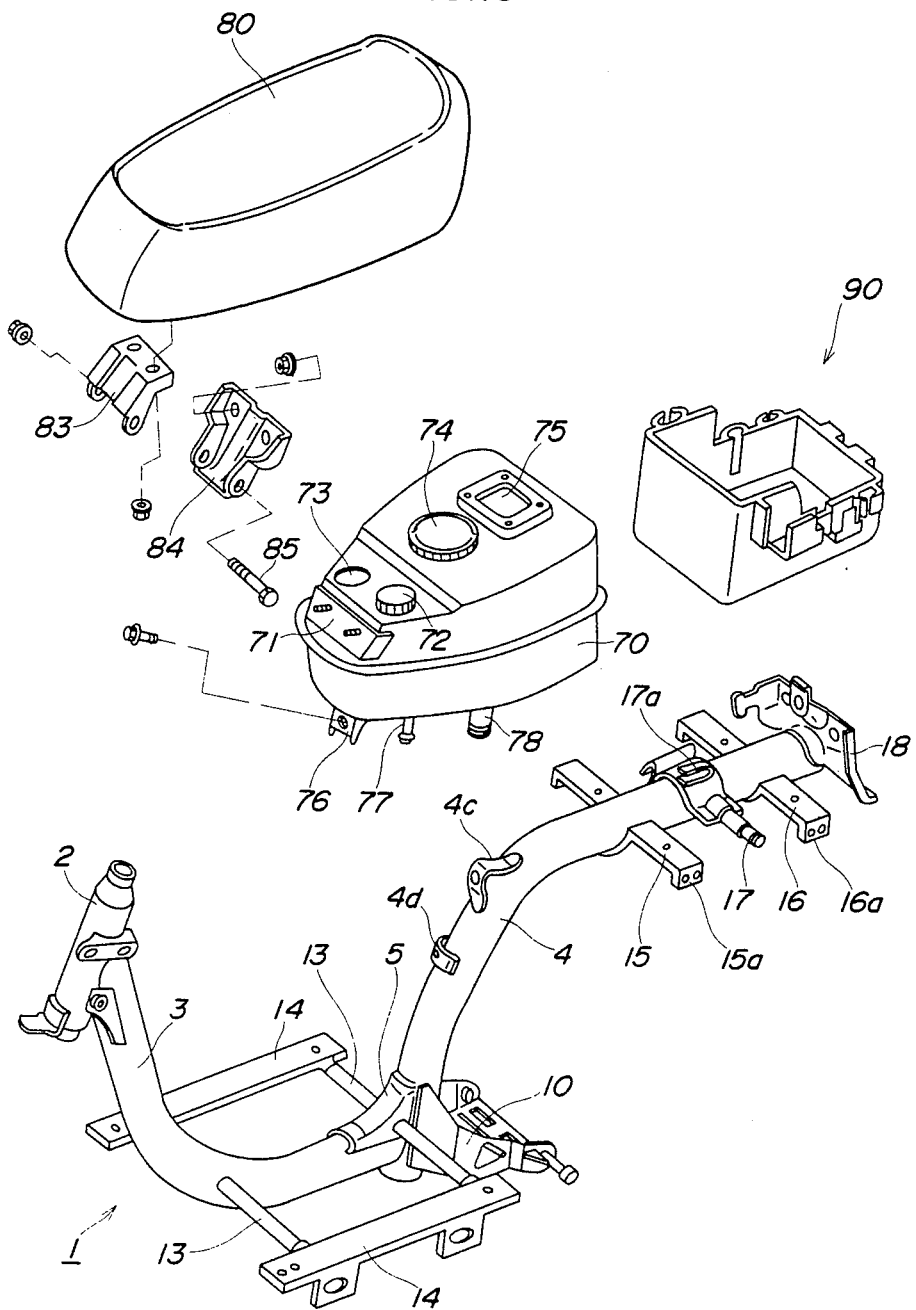
FIG. 10 is an exploded perspective view of details of the body cover.

A fuel tank 70, best shown in FIG. 10, is mounted on the center tube 4, at its stay 4c and the tank mounting stay 15. The tank 70 has its ceiling wall provided with a seat mounting bracket 71, an oil filler opening 72, which is capped, an oil level gauge mounting opening 73, a fuel filler opening 74, which is capped, and a fuel meter attachment 75. A fitting bracket 76 and a pair of left and right fitting brackets 79 and 79 are projected from the bottom wall of the fuel tank 70. Further, an oil outlet pipe 77 and a fuel outlet pipe 78 are provided on the same bottom wall.

Figure 11:
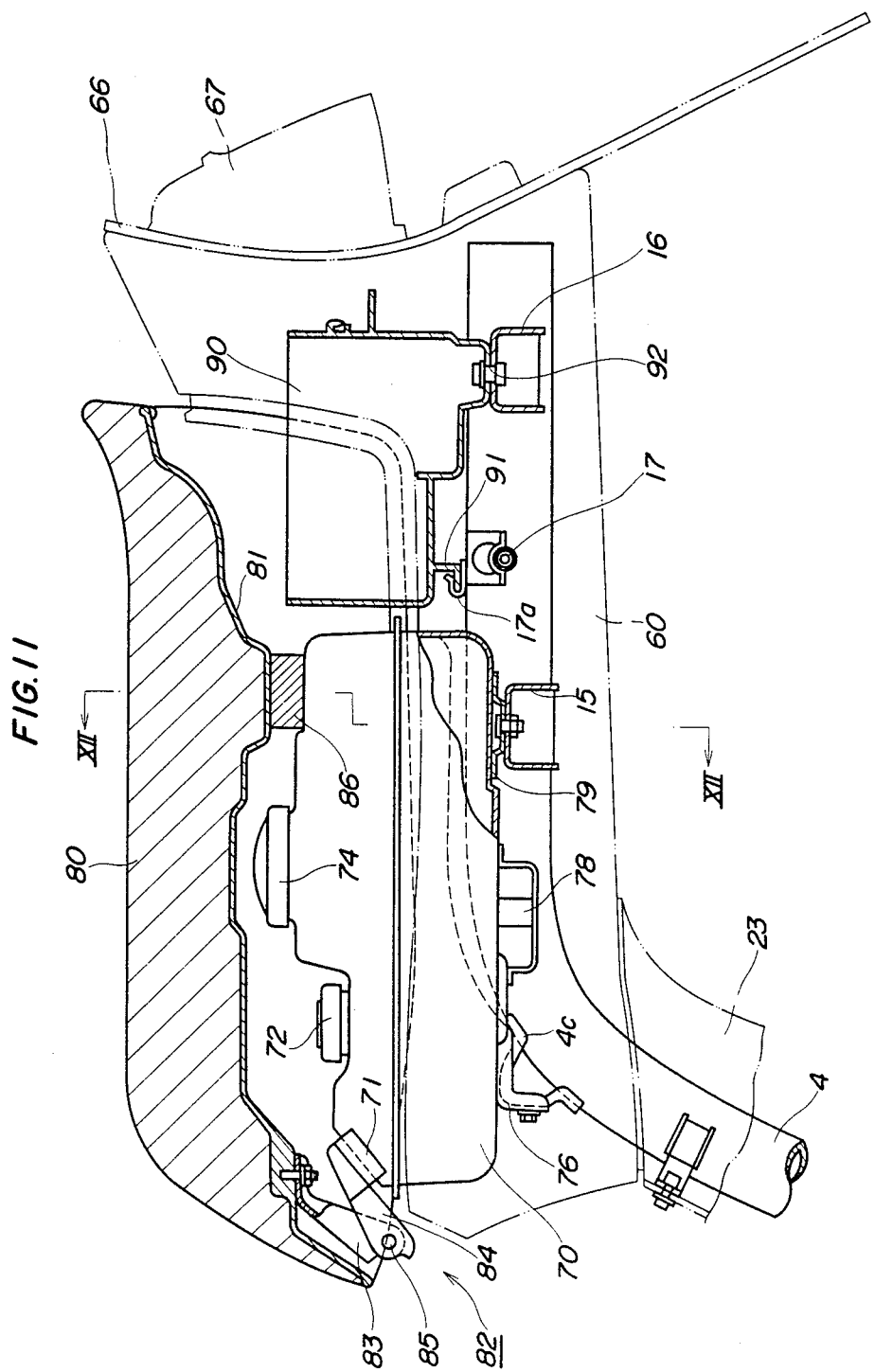
FIG. 11 is a longitudinal sectional view of the body cover mounted on the frame body.
Figure 12:
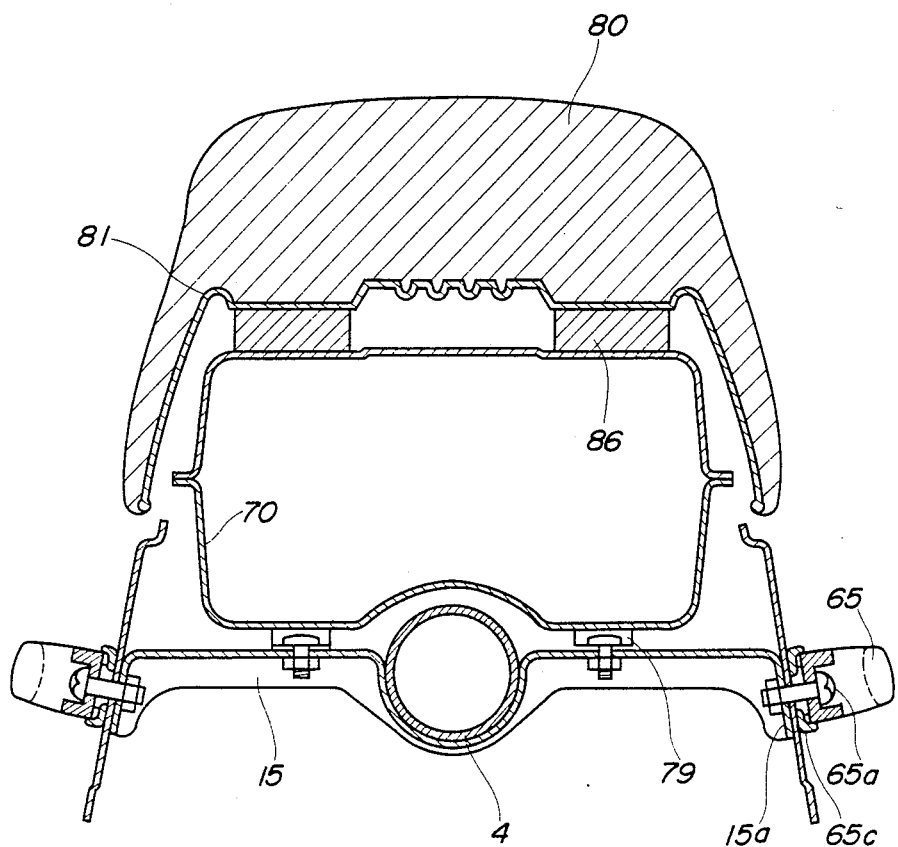
FIG. 12 is a sectional view taken along line XII—XII in FIG. 11.

In FIGS. 10 and 11, reference numeral 90 denotes a battery box, which is adapted to accommodate small tools and accessories, and which is mounted on the center tube 4, at the bracket 17a and the battery mounting stay 16. The battery box 90 has its bottom wall provided with a fitting bracket 91 at a front location, as well as a pair of left and right threadedly fitting openings 92 at a rear location.

The seat 80 is disposed above the body cover 60 in a manner covering its ceiling opening. It has a bottom plate 81 which carries at its front portion an upper hinge element 83, threadedly joined thereto and forming part of a hinge 82, and also carries at its rear portion a pair of left and right suction cups 86 and 86 secured thereto. A lower hinge element 84 of the hinge 82 is threadedly joined to the seat mounting bracket 71 on the fuel tank 70 and is pivotally coupled to the upper hinge element 83, through a bolt 85.

The manner of assembling the frame body 1 and its mounting parts will now be described. The floor portion of the floor 20 is positioned onto the horizontal portion 3b of the main tube 3, with its opposite lateral edges located right above the brackets 14 in such a manner that the holes 25a of the mounting flanges 25 are aligned with the corresponding holes 14a of the brackets 14. Then, bolts, not shown, are fitted through the holes 25a and 14a, and nuts, not shown, are threadedly fitted onto the bolts, to thus mount the floor 20 onto the frame body 1.

Figure 5:
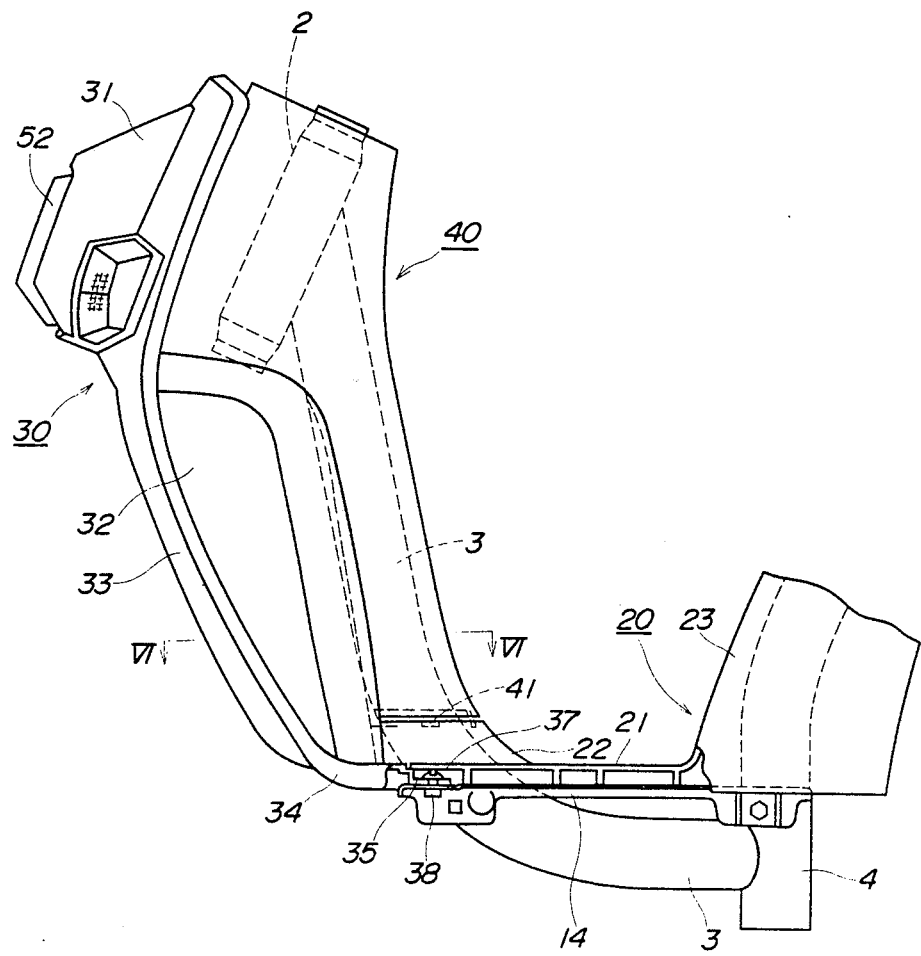
FIG. 5 is a side view, partly in longitudinal section, of the front shield of FIG. 4 and taken along line V—V in FIG. 6.
Figure 6:
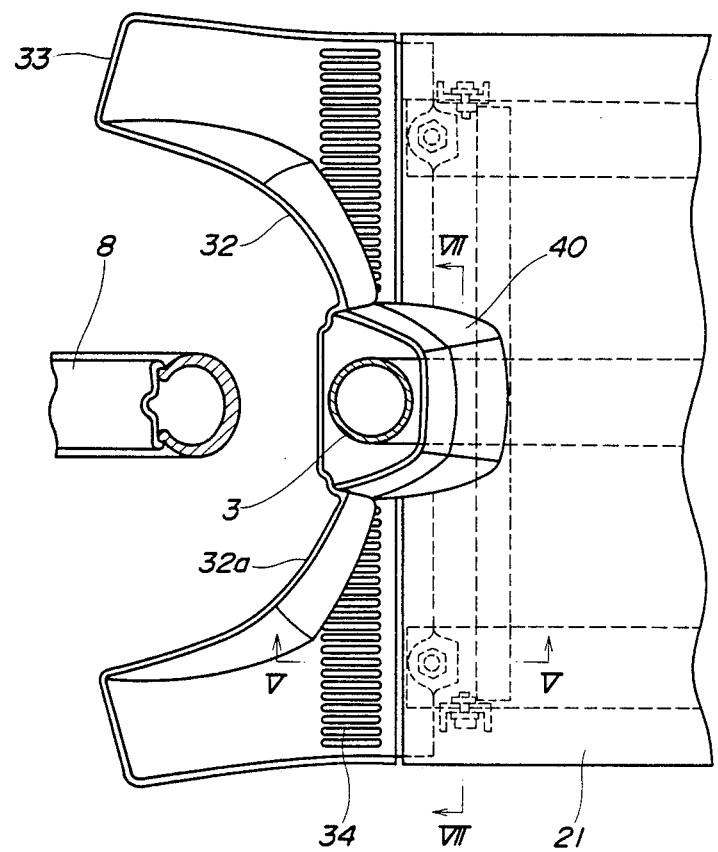
FIG. 6 is a sectional view taken along line VI—VI in FIG. 5.
Figure 7:
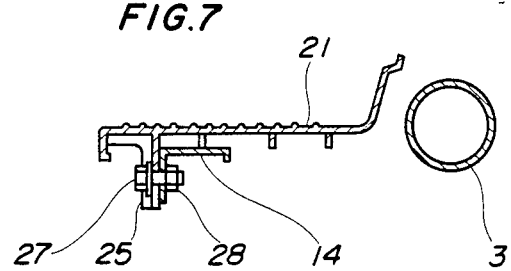
FIG. 7 is a sectional view taken along line VII—VII in FIG. 6.

The front shield 30 is moved toward the frame body 1 from a forward location until its fitting rear edge 35 becomes interposed between the floor portion 21 and the brackets 14. Screws 37 are fitted through the fitting holes 14b of the brackets 14, and nuts 38 are screwed onto the screws 37, as shown in FIG. 5. Then, as shown in FIG. 8, the head lamp housing 31 of the front shield 30 is mounted, at its lower portion, onto the front shield mounting bracket 47 by means of the fastner 49, which is mounted on the stay 46 projected from the head tube 2, to thus mount the front shield 30 onto the frame body 1.

On the other hand, the engaging pawls 41 at the lower end of the main tube cover 40 are engaged into the engaging holes 22a of the main tube cover mounting portion 22 of the floor 21, and then screws 44 are fitted through the holes 43 of the front joining edges 42 of the main tube cover 40 and through the mounting portions, not shown, of the front shield 30, followed by screwing nuts 45 onto the above screws 44, thus mounting the main tube cover 40 onto the floor 20 and the front shield 30.

Further, to mount the fuel tank 70 onto the center tube 4, the fitting bracket 76 of the fuel tank 70 is joined to the stay 4c on the center tube 4 by means of a screw, and the paired left and right fitting brackets 79 at the rear portions of the tank 70 are joined to the tank mounting stay 15 by bolts and nuts.

Further, the battery box 90 is mounted onto the fuel tank 70 at its rear portion. That is, the fitting bracket 91 of the battery box 90 is brought into engagement with the bracket 17a on the center tube 4, and the battery box is joined to the battery mounting stay 16, at the threadedly fitting openings 92, by means of bolts and nuts.

Next, to mount the body cover 60 onto the floor 20, the body cover 60 is fitted over the fuel tank 70 and the battery box 90 in a manner enclosing same. In this position, the coupling flange 61a projected from the front wall 61 is aligned with the engaging hole 23a of the floor covering wall 23 of the floor 20, and the screw 68 is fitted through the hole 23a and the coupling bracket 61a, and then screwed into the stay 4d of the center tube 4, thus joining the upper end of the covering wall 23 to the lower end of the front wall 61 of the body cover 60.

Then, to mount the body cover 60 onto the frame body 1, the fitting openings 62a and 62b in the lateral side walls 62 of the body cover 60 are brought into alignment with the left and right ends 15a and 16a of the stays 15 and 16, with spacers 65c interposed between the openings 62a, 62b and the above end portions 15a, 16a, and then screws 65a are fitted through through holes formed in the glove rails 65 as well as the holes 62a and 62b and screwed into tapped holes 15b and 16b formed in the end faces of the ends 15a and 16a of the stays 15 and 16. After tightening the screws 65a, the covers 65d are mounted onto the glove rails 65. Then, the lamp mounting member 66 is mounted onto the body cover 60 by engaging the fitting bosses 66b and 66c and the threadedly fitting portion 66d with the fitting brackets 63b and 63b, on the inner walls of the rear lateral side walls 63 and the bracket, not shown, on the rear end upper edge of the body cover 60, while directly engaging the boss 66a with the rear cover mounting stay 18, followed by fastening these portions together by means of screws. In this state, the brackets 63b, and the bosses 66a, 66b and 66c are fixed with respect to the stay 18.

Further, the lower hinge element 84 of the hinge 82 is threadedly joined to the seat mounting bracket 71, and the upper hinge element 83 to the seat, respectively, thus mounting the seat 80 onto the fuel tank 70. The seat 80 thus mounted onto the fuel tank 70 is pivotable about the hinge 82, permitting its lower space to be exposed to the outside when it is pivoted to have its one end upwardly displaced.

After the front shield 30 and the main tube cover 40 have been mounted onto the frame body 1 as previously stated, the upper end of the front fork 6, which already carries the front wheel 8 through the buffer 7, is upwardly fitted through the head tube 2, and then the steering handle 9 is rigidly mounted onto the upper end of the front fork 6.

According to the above described arrangement of the present invention, the following excellent results can be obtained:

(1) Since the frame body 1 is in the form of a substantially single pipe over its whole length, it has a reduced number of component parts, enhancing the productivity. Particularly, a large space for mounting parts such as the body cover can be obtained at the rear portion of the frame body 1, facilitating the mounting of the parts onto the frame body 1.

(2) The arrangement that the front shield 30 is formed of a one-piece member formed integrally with the head lamp housing 31, the auxiliary fender 32, the leg shields 33 and the foot rests 34 can reduce the number of component parts, the number of man-hour for fabrication and assemblage of the front shield, resulting in a reduction in the production cost;

(3) Omission of a conventionally rearwardly extending portion of the front fender 19 enables the leg shields 33 of the front shield 30 to extend as forward as possible, and simultaneously also enables a lower portion of the leg shields 33 to be formed as foot rests 34, enlarging the space on which the driver's foots are rested. This also permits reducing the axial size of the motorcycle body to make same compact in size, without reducing the foot resting space;

(4) Since the body cover 60 is formed of a one-piece member formed integrally with the front wall 61, the opposite front lateral side walls 62, and the opposite rear lateral side walls 63, the number of man-hour for fabrication and assemblage can be reduced due to its reduced number of component parts, dispensing with the use of joining parts such as screws, as required by a conventional split type body cover, resulting in a reduction in the production cost. Further, the one-piece body cover has an improved appearance; and (5) The seat 80, which is pivotable about the hinge 82 at its one end, facilitates maintenance of various equipments accommodated within the space below the seat 80 and permits easy taking tools or the like out of the battery box 90 and replacing same into the box.

While a preferred embodiment of the invention has been described, using specific terms, such description is for illustrative purposes only, and it is to be understood that changes and variations may be made without departing the spirit and scope of the following claims.

What is claimed is:

1. A motorcycle comprising:

a frame body having the shape of a substantially single pipe over substantially the whole length thereof, said frame body including a first portion vertically extending, slightly forwardly inclined and having a lower end, a second portion substantially horizontally and rearwardly extending from said lower end of said first portion and having a rear end, a third portion upwardly extending from said rear end of said second portion, rearwardly inclined and having an upper end, and a fourth portion substantially horizontally and rearwardly extending from said upper end of said third portion;

a head tube rigidly secured to said first portion of said frame body, a front fork turnably supported by said head tube, and a front wheel rotatably supported by said front fork;

a floor mounted on said second portion of said frame body;

a front shield mounted on said first portion of said frame body, said front shield comprising a head lamp housing located forwardly of said head tube, an auxiliary fender located immediately below said head lamp housing and intervening between said first portion of said frame body and said front wheel, said auxiliary fender having a concave front face and substantially vertically extending, a pair of leg shields located at opposite lateral sides of said auxiliary fender and downwardly extending from a location in the vicinity of said head lamp housing, said leg shields being located at opposite lateral sides of said head lamp housing, said front fork and a rear edge of said front wheel, and a pair of foot rests extending substantially horizontally and rearwardly from respective ones of said leg shields into a level flush with said floor, said front shield comprising a one-piece member formed integrally with said head lamp housing, said auxiliary fender, said leg shields, and said foot rests; and a body cover mounted on said fourth portion of said frame body and accommodating at least one accessory of said motorcycle.

2. The motorcycle as claimed in claim 1, wherein said auxiliary fender extends from a location slightly below said head lamp housing to a location in the vicinity of said lower end of said first portion of said frame body.

3. The motorcycle as claimed in claim 1, wherein said leg shields have upper portions thereof located slightly forwardly of said head tube and an upper portion of said front fork in a manner enclosing same at opposite lateral sides thereof, and lower portions thereof located sightly forwardly of a rear edge of said front wheel in a manner enclosing same at opposite lateral sides thereof.

4. A motorcycle comprising:

a frame body having the shape of a substantially single pipe over substantially the whole length thereof, said frame body including a first portion vertically extending, slightly forwardly inclined and having a lower end, a second portion substantially horizontally and rearwardly extending from said lower end of said first portion and having a rear end, a third portion upwardly extending from said rear end of said second portion, rearwardly inclined and having an upper end, and a fourth portion substantially horizontally and rearwardly extending from said upper end of said third portion;

a front shield mounted on said first portion of said frame body;

a floor mounted on said second portion of said frame body;

a plurality of stays transversely secured on said second portion of said frame body and arranged in parallel and spaced relation to each other, said stays each having opposite end portions thereof laterally projected from said second portion of said frame body, a pair of brackets axially secured on said stays and arranged in parallel and spaced relation to each other, said floor having opposite lateral edges thereof disposed on said brackets, and means rigidly joining said opposite lateral edges of said floor to said brackets; and a body cover mounted on said fourth portion of said frame body and accommodating at least one accessory of said motorcycle.

5. The motorcycle as claimed in claim 4, wherein said joining means comprises a plurality of mounting means provided on said brackets, each having at least one first through hole, a plurality of mounting flanges corresponding in number to said mounting means and downwardly pending from said opposite lateral edges of said floor, said mounting flanges each having at least one second through hole aligned with said at least one first through hole of said mounting means, and means fitted through said first and second through holes to fasten said mounting means to said mounting flanges.

6. The motorcycle as claimed in claim 5, including first fitting means provided at a rear edge of said front shield, second fitting means provided at a front end of said brackets and aligned with said first fitting means, and fastening means fastening said first and second fitting means together to join said front shield to said floor.

7. A motorcycle comprising:

a frame body having the shape of a substantially single pipe over substantially the whole length thereof, said frame body including a first portion vertically extending, slightly forwardly inclined and having a lower end, a second portion substantially horizontally and rearwardly extending from said lower end of said first portion and having a rear end, a third portion upwardly extending from said rear end of said second portion, rearwardly inclined and having an upper end, and a fourth portion substantially horizontally and rearwardly extending from said upper end of said third portion;

a front shield mounted on said first portion of said frame body;

a floor mounted on said second portion of said frame body;

a seat having a front end, opposite lateral side walls, and a rear end;

a body cover mounted on said fourth portion of said frame body and accommodating at least one accessory of said motorcycle, said body cover having a front wall located below said front end of said seat, opposite front lateral side walls located below said opposite lateral side walls of said seat, opposite rear and upper lateral side walls extending rearwardly and upwardly from said opposite front lateral side walls and disposed opposite said rear end of said seat, and a ceiling surface formed with an opening, said body cover comprising a one-piece member formed integrally with said front wall, said opposite front lateral side walls, and said rear and upper lateral side walls, said seat being arranged above said body cover and disposed in said opening of said ceiling surface, said body cover and said seat cooperatively defining therebetween a space for accommodating said accessory, said seat being substantially directly supported by said accessory;

hinge means provided at one end of said seat and supporting said seat for pivoting about said hinge, whereby said space for accommodating said accessory is exposed to the outside when said seat is pivoted to have another end thereof upwardly displaced; and means joining said accessory to said fourth portion of said frame body, wherein said body cover has an open bottom surface, and said accessory is directly joined to and supported by said fourth portion of said frame body through said open bottom surface of said body cover.

8. The motorcycle as claimed in claim 7, including a covering wall erected from a rear portion of said floor, and means provided at said front wall of said body cover and joining said front wall to said covering wall.

9. The motorcycle as claimed in claim 7, wherein said hinge means comprises an upper hinge element mounted on said one end of said seat, and a lower hinge element mounted on said accessory.

10. The motorcycle as claimed in claim 9, wherein said accessory comprises a fuel tank.

11. The motorcycle as claimed in claim 7, including means mounting a lamp on said body cover, and wherein said body cover has a rear end face thereof opened, and said lamp mounting means is mounted on said body cover in a manner covering said rear end face.

* * * * *